UNITED STATES PATENT OFFICE.

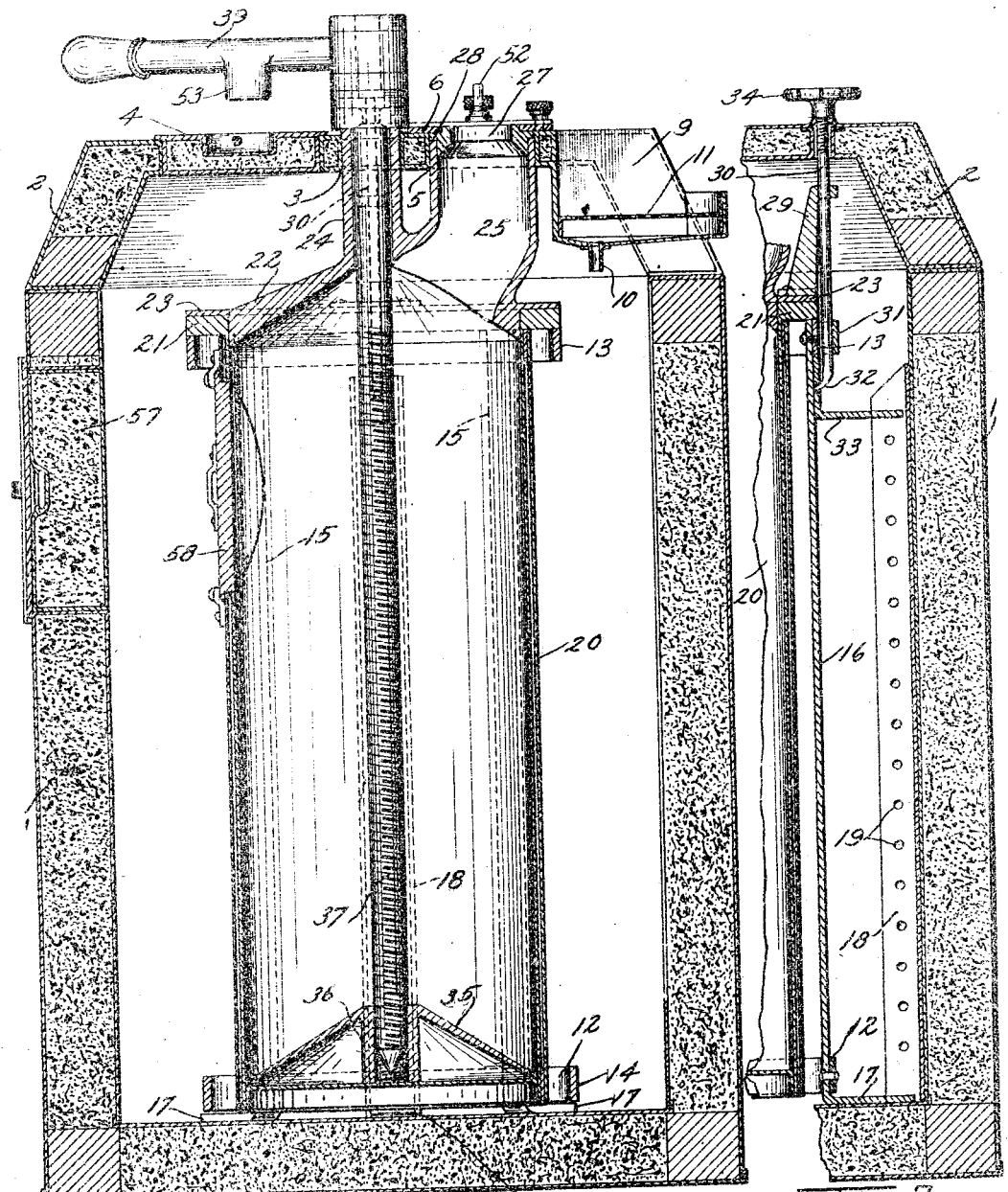

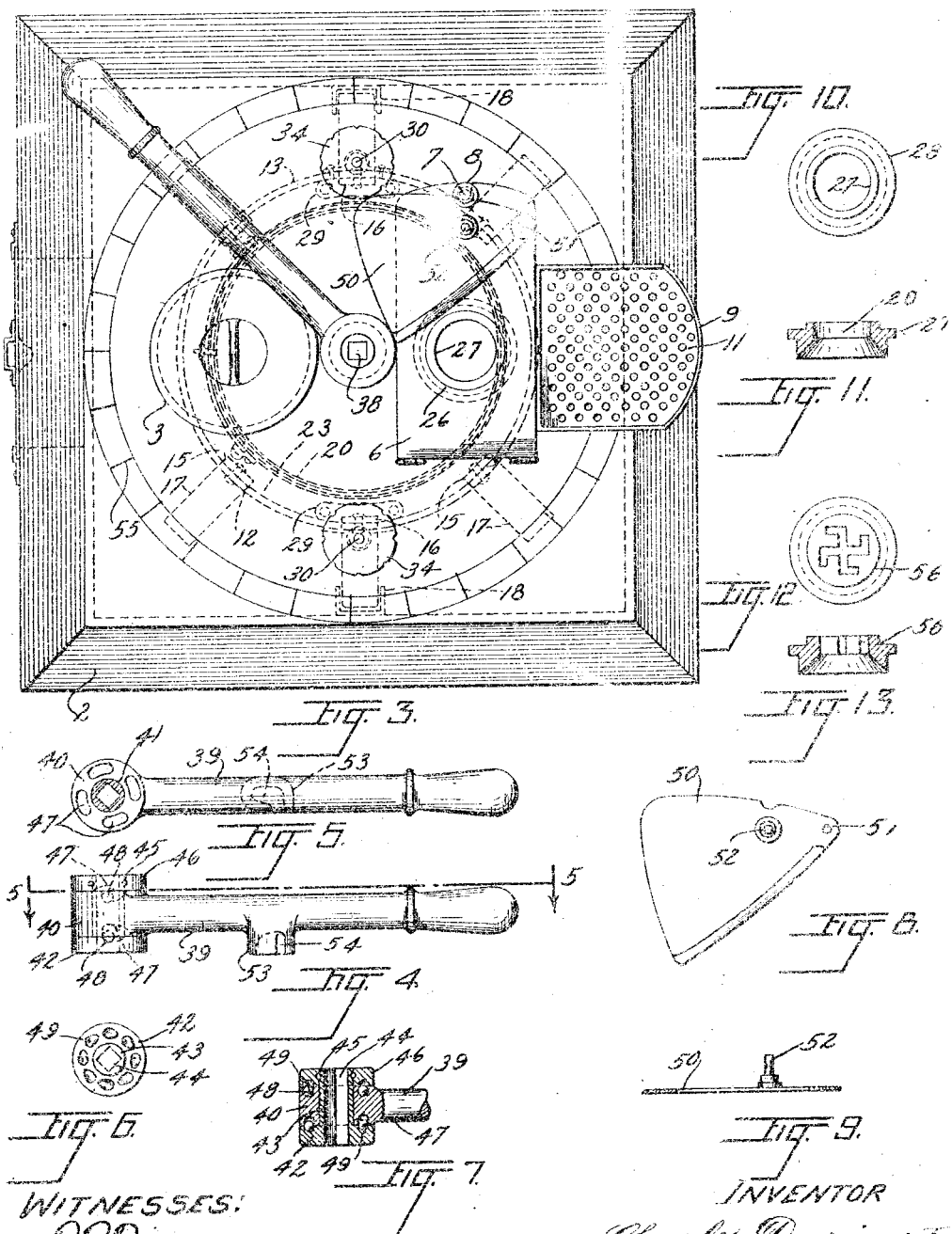

CHARLES DOERING, JR., OF CHICAGO, ILLINOIS.

ICE-CREAM DISPENSER.

1,091,643.  Specification of Letters Patent.  Patented Mar. 31, 1914.

Application filed November 16, 1911. Serial No. 660,611.

*To all whom it may concern:*

Be it known that I, CHARLES DOERING, Jr., a citizen of the United States, and residing at Chicago, in the county of Cook and State of Illinois, have invented a new and useful Improvement in Ice-Cream Dispensers, of which the following is a complete specification.

The main objects of this invention are to provide an improved sanitary ice cream dispenser; to provide an ice cream dispenser from which the contents may be automatically measured and dispensed without opening the receptacle; to provide a device adapted to measure out varying quantities of its contents; to provide improved means for automatically severing or separating the desired quantity; to provide improved means for operating the discharge mechanism; and to provide a strong and durable construction adapted to dispense its contents with great efficiency.

A specific embodiment of the invention is illustrated in the accompanying drawings, in which:

Figure 1 is a central vertical section of an ice cream dispenser, embodied in this invention. Fig. 2 is a fragmentary vertical section taken at right angles to the view shown in Fig. 1. Fig. 3 is a top plan view of the device. Fig. 4 is a side elevation of the operating handle or crank. Fig. 5 is a section taken on line 5—5 of Fig. 4. Fig. 6 is a top plan view of one of the locking collars for the crank. Fig. 7 is a vertical section of the crank head and locking collars. Fig. 8 is a top plan view of the measuring blade. Fig. 9 is a side elevation of the measuring blade. Fig. 10 is a top plan view of one form of mold adapted to be used with the device. Fig. 11 is a vertical section of the mold shown in Fig. 10. Fig. 12 is another form of mold adapted to be used with the device. Fig. 13 is a vertical section of the mold shown in Fig. 12.

In the construction shown, an outer refrigerating receptacle 1 is preferably constructed with walls of insulating material adapted to maintain an approximately uniform temperature in the receptacle. The receptacle is provided with a cover or closure 2 having a central aperture 3 therein, at one side of which is a lid 4 affording access to the receptacle without removing the cover. On the opposite side of the aperture 3, the cover is provided with an aperture 5 and a cutting bed or plate 6 is hinged on the cover and is adapted to lie flat on the cover over said aperture 5 and is held down in place by a bolt 7 on the cover having nut 8 thereon. Adjacent the outer edge of the plate 6 is a cup 9 set into the cover having a drain pipe 10 in its bottom opening into the receptacle. A screen 11 is mounted in the cup at a point sufficiently below the level of the plate 6 to permit a dish to set thereon without projecting above the plate.

Within the receptacle 1 is the can supporting frame 12, which comprises an upper ring 13 and a lower ring 14 which are riveted to uprights 15 and 16 having outwardly turned feet 17 at their lower ends to support the frame. The feet 17 of the uprights 16 extend into guide channels 18 on the sides of the receptacle which prevent the frame from turning. Said channels are provided in their sides with a plurality of registering apertures 19.

The ice cream can 20 has an outwardly directed flange 21 at its top which rests on the top of the frame when the can is inserted in the frame, as shown in Fig. 1. The can cover 22 fits within the top of the can and has a peripheral flange 23 which rests on the flange 21.

Extending upwardly from the cover 22, axially of the can is a bearing sleeve 24 which projects through the aperture 3 in the cover 2. Opening from the cover 22 and extending upwardly therefrom at one side of the sleeve 24 is the discharge pipe 25 which projects into the aperture 5 in the cover 2. The plate 6 is provided with an aperture 26 in register with the aperture 5, and a mold 27 fits at its lower end in the top of the pipe 25 and at its upper end in the aperture 26, and is provided with a peripheral flange 28 which rests on the top of the pipe 25.

On the cover 22 above the uprights 16 are brackets 29, each of which carries a rod 30 which extends downwardly through a sleeve 31 on the ring 13, and its lower end is provided with a hook 32 adapted to engage in an aperture in a bracket 33 which is secured to the upright 16 and projects into the guide 18. The upper end of the rod 30 is threaded and projects through the cover 2 and is provided on its upper end with a nut 34, adapted when screwed down on the rod to draw the can upwardly into binding engagement with the cover 22 and hold the discharge pipe 25 firmly in the aperture 5.

Within the can is a cone shaped piston 35 having an axial, internally threaded sleeve 36 thereon, in which a shaft 37 has threaded engagement. The shaft 37 extends upwardly through the sleeve 24, and its upper end 38, shown in Fig. 3, is angular and projects above the receptacle cover 2.

For the purpose of operating the shaft 37, a handle or crank 39 is provided and has a head 40 at its inner end in which is a cylindrical aperture 41. A locking collar 42 has a cylindrical sleeve 43 extending upwardly through the head 40 and is provided with an angular bore 44 therethrough. Secured on the upper end of the sleeve 43 by means of pins 45 is a locking collar 46 which bears against the head 40. The head 40 is provided in each face with elongated pockets 47 which are arranged concentrically with the aperture 41 and which are deep enough at one end to contain locking balls 48 out of contact with the locking collars and which grow shallower toward their opposite ends or those directed away from the direction of travel of the crank when operating the shaft 47. Each of the collars is provided in its inner face with pockets 49 which are shallower than the diameter of the balls 48, and also decrease in depth toward their rear ends. When the crank is placed on the end 38 of the shaft 37 with the locking collar 42 downwardly, and the crank is turned clockwise, the shallow ends of the pockets 47 in the lower face of the head 40 will engage in the lower balls 48 and move them to the deep ends of the pockets 49 and cause the shaft to rotate. When the movement of the crank is reversed the balls run into the deep ends of the pockets 47 and travel on the top of the collar 42. The upper balls 48 remain in the deep ends of their pockets 47 and do not interfere with the operation of the shaft.

A measuring and severing blade 50 of triangular shape is pivoted at one end 51 to the plate 6 in position to be swung over the top of the mold 27 and sever the ice cream which is ejected. For the purpose of operating the blade 50 it is provided with an upwardly directed pin 52 near its pivotal point, and the crank 39 is provided on its side adjacent to the locking collar 42 with a boss 53 which has an eccentric opening 54 in the side thereof adapted when the crank is turned to engage the pin 52 and swing the blade forward or backward over the mold.

The top of the cover 2 is provided with a graduated scale 55 by means of which the movement of the crank 39 is determined to regulate the movement of the piston to eject the desired quantity of cream.

If preferred other forms of molds may be employed, for instance, as the molds 56 shown in Figs. 12 and 13.

The receptacle 1 and the can 20 are provided in their sides with registering apertures in which are closures 57 and 58.

If desired to use a shorter can in the receptacle the frame 12 is made shorter and the feet 17 of the uprights 16 rest on pins in the apertures 19 of the guide channels 18.

The operation of the construction shown is as follows: The can, with its cover thereon, is placed in the frame 12 in the receptacle 1 and the cover 2 of the receptacle is put in place. The nuts 34 are then tightened to hold the cover 2 firmly in place and the discharge pipe 25 firmly in the aperture 5. against the mold. The blade 50 is placed in closed position over the mold, and the crank is fitted onto the upper end of the shaft 37 with the pin 52 of the blade projecting into the boss 53 on the crank. The crank is then turned counter-clockwise to the point on the scale 55 indicating the quantity of ice cream desired. As the crank begins to move counter-clockwise it moves the blade to open position and then releases and completes its travel, during which it is not locked to the shaft 37, since the lower balls 48 are forced into the deep ends of the pockets 47. When the crank is reversed and turned clockwise it locks with the collar 42 and rotates the shaft 37, thereby causing the piston 35 to travel upwardly sufficiently to eject the desired amount of cream through the mold. As the crank nears the limit of its movement the boss 53 engages the pin 52 and forces the blade across the top of the mold with a quick movement thereby severing the ejected cream when it may be scraped from the blade into a dish in the cup 9. The blade remains over and closes the mold opening until it is again operated. After the cream has all been dispensed the crank 39 is turned over with the locking collar 46 downwardly, and when the crank is turned counter-clockwise, the piston is returned to the bottom of the can.

While but one specific embodiment of the invention has been herein shown and described, it will be understood that many details of the construction shown may be varied or omitted without departing from the scope of the claim.

I claim:

An ice cream dispenser, comprising a receptacle having an aperture in its top, an ice cream can supported in the receptacle having a discharge pipe opening through said aperture, a mold in the top of said pipe a plate hinged on the receptacle and having an aperture registering with said mold, a blade pivoted on the plate, and means adapted to move the blade across the mold.

In testimony whereof I have hereunto subscribed my name in the presence of two witnesses.

CHARLES DOERING, Jr.

Witnesses:
HENRY H. DOERING,
JOHN H. BAUMGARTNER.